(12) United States Patent
Lozinski et al.

(10) Patent No.: US 9,198,222 B2
(45) Date of Patent: Nov. 24, 2015

(54) TELECOMMUNICATION NETWORK

(75) Inventors: Zygmunt A. Lozinski, Cambridge (GB);
Brian P. Naughton, Reading (GB);
Malcolm G. Nicholas, Berks (GB)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 12/582,756

(22) Filed: Oct. 21, 2009

(65) Prior Publication Data

US 2010/0099426 A1    Apr. 22, 2010

(30) Foreign Application Priority Data

Oct. 22, 2008  (EP) ..................................... 08167280

(51) Int. Cl.
| G06F 15/16 | (2006.01) |
| H04W 84/02 | (2009.01) |
| H04L 12/24 | (2006.01) |
| H04W 24/04 | (2009.01) |
| H04W 24/08 | (2009.01) |
| H04W 88/14 | (2009.01) |

(52) U.S. Cl.
CPC ........... *H04W 84/02* (2013.01); *H04L 41/0677* (2013.01); *H04L 41/0896* (2013.01); *H04L 41/509* (2013.01); *H04L 41/5087* (2013.01); *H04W 24/04* (2013.01); *H04W 24/08* (2013.01); *H04W 88/14* (2013.01)

(58) Field of Classification Search
USPC .......................... 709/220, 223, 224, 232, 249
See application file for complete search history.

(56) References Cited

U.S. PATENT DOCUMENTS

| 6,973,023 | B1 * | 12/2005 | Saleh et al. .................... 370/217 |
| 7,197,561 | B1 * | 3/2007  | Lovy et al. ..................... 709/224 |
| 2002/0091819 | A1 | 7/2002 | Melchione et al. |
| 2005/0090283 | A1 * | 4/2005 | Rodriquez ................. 455/552.1 |
| 2005/0111441 | A1 * | 5/2005 | Koskelainen ................. 370/352 |
| 2006/0242241 | A1 | 10/2006 | Tock et al. |
| 2008/0077710 | A1 | 3/2008 | Kouvelas et al. |
| 2008/0222159 | A1 * | 9/2008 | Aranha et al. .................. 707/10 |
| 2009/0023477 | A1 | 1/2009 | Staudte |
| 2009/0086742 | A1 * | 4/2009 | Ghai et al. .................... 370/401 |
| 2010/0115149 | A1 | 5/2010 | Ewer |

OTHER PUBLICATIONS

ISOM, Office Action Communication for U.S. Appl. No. 13/611,768 dated Aug. 23, 2013, 30 pages.
ISOM, Office Action Communication for U.S. Appl. No. 13/611,768 dated Feb. 25, 2013, 23 pages.
ISOM, Office Action Communication for U.S. Appl. No. 13/611,768 dated Mar. 25, 2015, 33 pages.

* cited by examiner

*Primary Examiner* — Liangche A Wang
(74) *Attorney, Agent, or Firm* — Dan Simek; Hoffman Warnick LLC

(57) ABSTRACT

A telecommunication network including: a radio access network; and a network switching subsystem operable for communication with the radio access network and with a demand-driven, dynamically-configurable IP based computing infrastructure.

8 Claims, 9 Drawing Sheets

TELECOMMUNICATION NETWORK

FIELD OF THE INVENTION

The invention relates to the field of telecommunication systems. In particular, the invention relates to a telecommunications system operable in a distributed on-demand computing environment.

RELATED ART

Mobile telecommunication networks have seen advances in the bandwidth capabilities that they are able to provide through improved spectral efficiency. With the introduction of Third Generation (3G) mobile networks, network operators are able to offer a wider range of services while being able to take advantage of greater network capacity. A selection of these services includes telephony applications, video calling, and broadband wireless data services.

In an IP network environment service providers are also seeing a shift in the services that they are able to provide to users. These services include social networking applications, playback of television programs offered by a television network company, and applications where music can be bought and downloaded.

The characteristics of these services are very different from their predecessors. For example, these services require greater bandwidth, greater storage, and greater latency. Further, their growth rates are different because new services appear and disappear very quickly and new services have what is termed 'flash traffic' (e.g., new services have instantaneous popularity and thus service providers are challenged with among other things bandwidth issues).

Thus, there is a challenge faced by mobile telecommunication providers in how to provide these IP based services in a telecommunication environment while maintaining adequate bandwidth requirements in order to provide requested services from subscribers.

SUMMARY OF THE INVENTION

Viewed from a first aspect, the present invention is directed to a telecommunication network comprising: a radio access network; and a network switching subsystem for communicating with the radio access network and with a demand-driven, dynamically-configurable IP based computing infrastructure.

The present invention further comprises a telecommunication network wherein a base station controller function is associated with the network switching subsystem for processing communication requests from subscribers.

The present invention further comprises a telecommunication network wherein the IP based computing infrastructure is a high bandwidth and high availability network The present invention further comprises a telecommunication network wherein the network switching subsystem comprises a plurality of processing nodes, each processing node comprising an instance of a network switching function.

The present invention further comprises a telecommunication network wherein the network switching function comprises an instance of a call session control function, a radio control function, and a home subscriber service database for processing requests for communication services from subscribers.

The present invention further comprises a telecommunication network wherein a processing node further comprises a high availability component for monitoring the operating parameters of a processing node.

The present invention further comprises a telecommunication network wherein the high availability component further comprises an in-memory map of the telecommunication network comprising the operational status of each processing node associated with the telecommunication network.

The present invention further comprises a telecommunication network wherein the high availability component detects a failure of a processing node and in response to the detection of a failed processing node locates an alternative processing node as a substitute for the detected failed processing node.

The present invention further comprises a telecommunication network wherein the high availability component is operable for implementing a recovery failure plan in the event that a processing node is detected as no longer being operational.

The present invention further comprises a telecommunication network wherein the recovery plan comprises having a plurality of processing nodes in a standby mode which are accessible via the IP based network such that in the event that a processing node is detected as being no longer operational one of the plurality of processing nodes is able to perform the functions of the failed processing node.

The present invention further comprises a telecommunication network wherein the high availability component further comprises analyzing geographical information associated with subscriber requests for resources and network traffic information associated with a processing node to determine whether additional processing resource is required by a processing node or whether a processing node can be powered down because of a minimal amount of network traffic being detected.

The present invention further comprises a telecommunication network wherein the telecommunication network is a third generation network.

The present invention further comprises a telecommunication network wherein a request is received from a subscriber's mobile phone for accessing an IP based resource associated with a third party IP based network, wherein a request in the form or one or more IP packets is transmitted from the mobile phone device through a base transceiver station to an IP based network of a service provider who is hosting the requested resource.

The present invention further comprises a telecommunication network wherein if the request for a resource further comprises requests for telecommunication specific services a request is instantiated through an API of the service provider's IP based network in order to communicate a request to a call session control function in the telecommunication network.

Viewed from a second aspect, the present invention is directed to a method of communicating a telecommunication request initiated by a subscriber in a telecommunication network comprising: receiving a request for a voice or data communication by a radio access network; and communicating the received request to a network switching subsystem for processing by a demand-driven, dynamically-configurable IP based computing infrastructure.

Viewed from a third aspect, the present invention is directed to a computer program product loadable into the internal memory of a digital computer, comprising software code portions for performing, when the computer program product is run on a computer, the invention as described herein.

BRIEF DESCRIPTION OF THE DRAWINGS

Embodiments of the present invention will now be described, by way of examples only, with reference to the accompanying drawings.

DETAILED DESCRIPTION OF THE INVENTION

Figure 1:
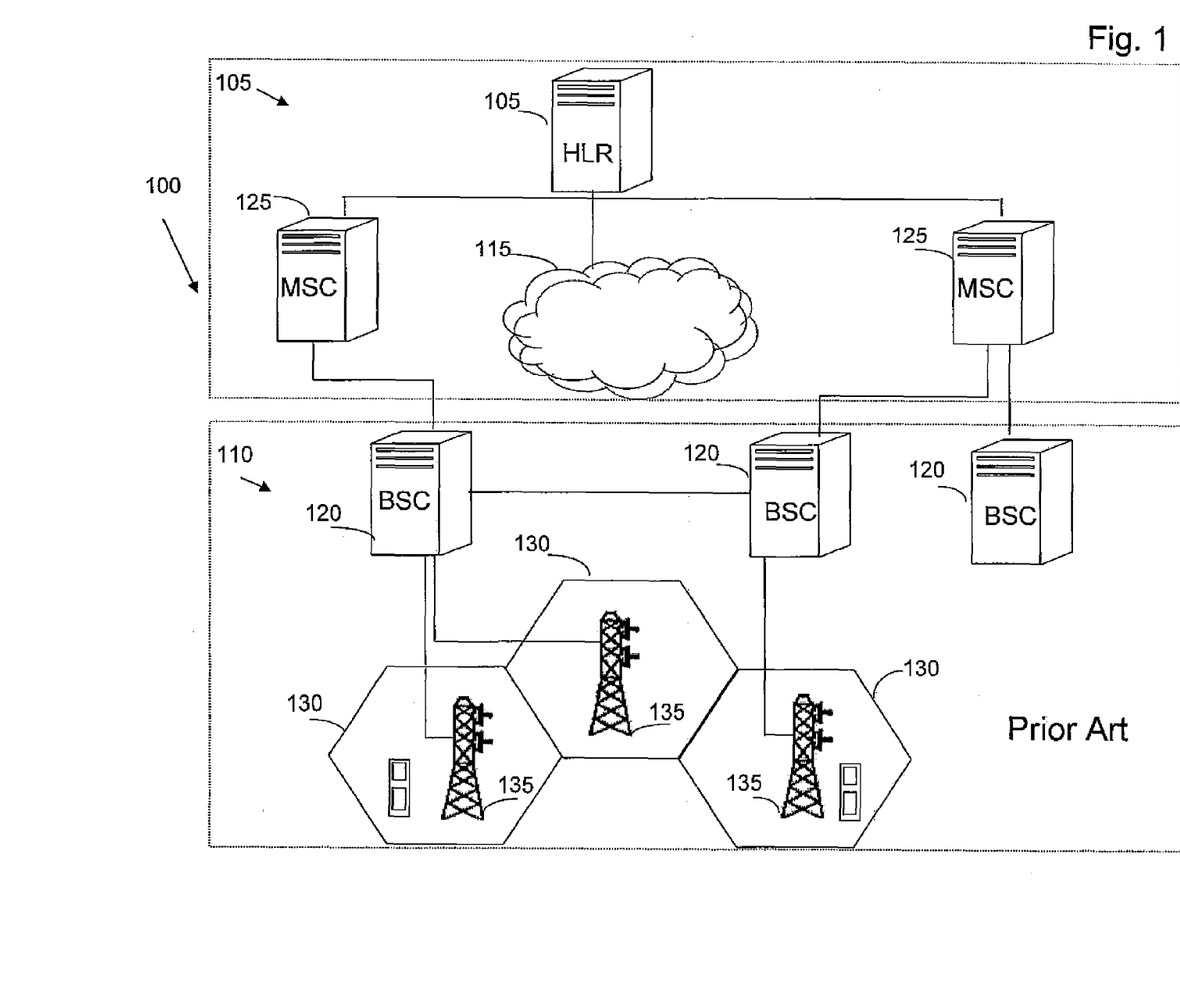
FIG. 1 is a block diagram detailing the components of a prior art GSM telecommunication network.

FIG. 1 details a known GSM telecommunication network 100. GSM is a cellular network which allows a voice or data communication initiated from a mobile phone to use a cell 130 in the mobile phone's immediate vicinity. A GSM telecommunication network 100 allows subscribers to roam and switch between network operators and to take advantage of services such as voice calling and SMS etc.

The components of the GSM telecommunication network 100 are explained in order to place the invention in context.

The GSM telecommunication network 100 comprises a network switching subsystem 105 and a radio access network subsystem 110. The network switching subsystem 105 and radio access network subsystem 110 work together in order to process telecommunication requests from subscribers to receivers.

The radio access network subsystem 110 is responsible for processing network traffic between a mobile phone and the network switching subsystem 105. The radio access network subsystem 110 performs such functions as transcoding of speech channels, allocation of radio channels to mobile phones, paging, quality management of transmission, etc.

The radio access network subsystem 110 comprises a number of cells 130. Each cell 130 comprises equipment that is responsible for enabling wireless communication between mobiles phones (and like equipment) via the GSM telecommunication network 100. Each cell 130 is responsible for a geographical area of coverage and comprises a base transceiver station (BTS) 135 for receiving and transmitting radio signals and means for encrypting and decrypting radio communications received by and transmitted to and by a mobile phone, etc.

A cell 130 is associated with a base station controller (BSC) 120. The base station controller (BSC) 120 receives data from a base transceiver station (BTS) 135 and is responsible for control functions and physical links between the network switching subsystem 105 and the base transceiver station (BTS) 135. The base station controller (BSC) 120 provides the functionality of a high capacity switch that provides functions such as communication handover, cell configuration, and the control of radio frequency power levels in the base transceiver stations (BTS) 135. The base transceiver station (BTS) 135 is operable for communication with the network switching subsystem 105.

The network switching subsystem 105 is responsible for the functions of switching and managing communications between mobile phones and the public switched telephone network (PSTN). The network switching subsystem 105 comprises core components such as a mobile switching center (MSC) 125, a communication network 115, and a home location register (HLR) 105. The mobile switching center (MSC) 125 is responsible for processing voice calls, SMS, multi-party calls, facsimile transmissions, etc. The mobile switching center (MSC) 125 is also responsible for setting up and releasing a communication connection between a subscriber and a receiver, hand-over requirements from one cell 130 to another cell 130 as a subscriber roams through one cell 130 to another cell 130, and business functionality such as call monitoring in order to determine call charging. etc.

The home location register (HLR) is a database comprising information such as the mobile phone number of a subscriber, information associated with a subscriber's SIM card, services that a subscriber has subscribed to, a current cell location of the subscriber, etc.

A person skilled in the art will realize that there are many other aspects to a GSM telecommunication network 100, and that the above description is only intended to be an introduction to the main components of a GSM telecommunication network 100.

Figure 2:
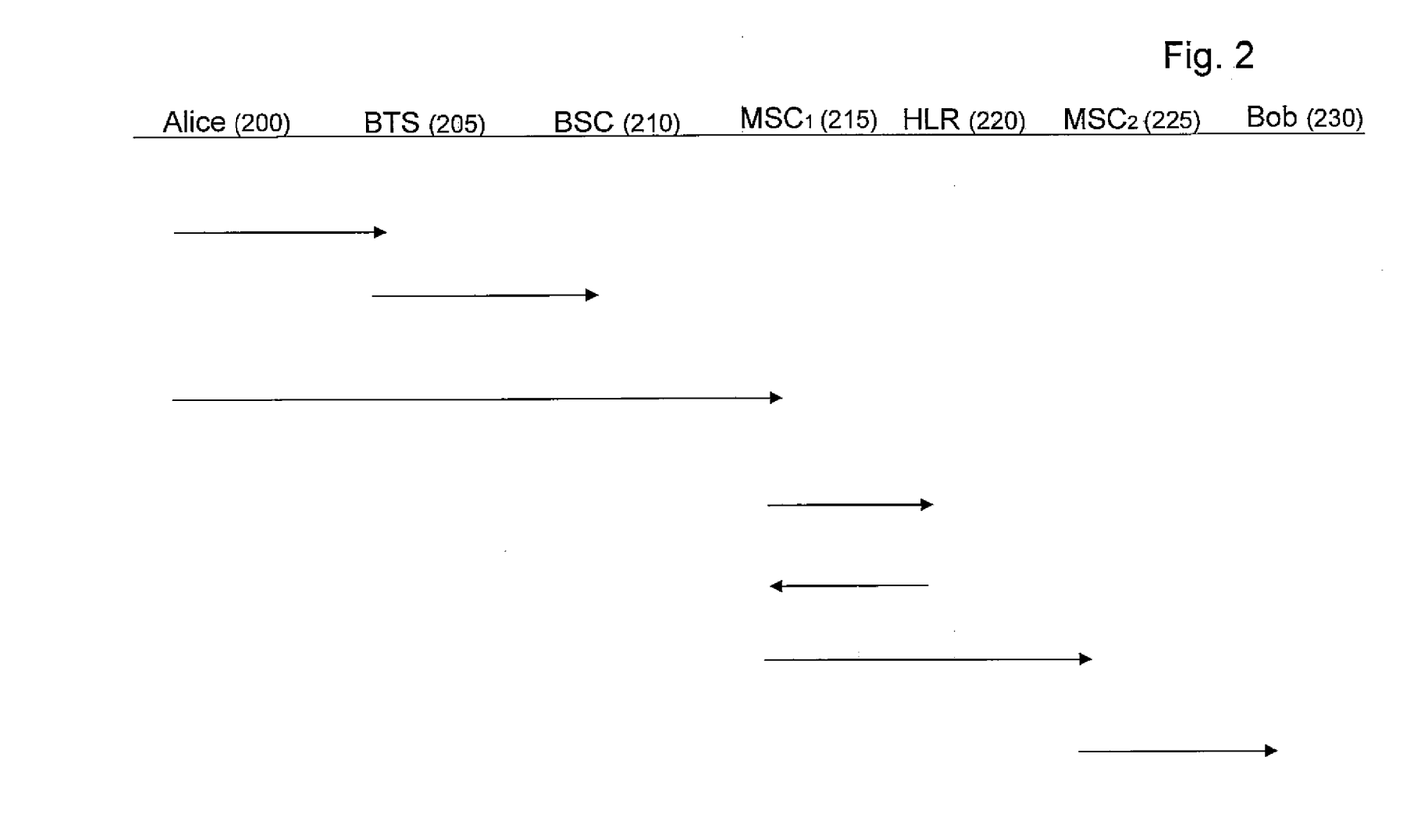
FIG. 2 is sequence chart showing the interaction between a caller and a receiver in a prior art GSM network.

With reference to FIG. 2, it can be seen how each of the components within the networking switching subsystem 105 and the radio access network subsystem operate 110 when a call has been initiated by a subscriber (Alice) and to a receiver (Bob).

The subscriber (Alice) 200 initiates a call to receiver (Bob) 230 via her mobile phone or other telecommunication device. The base transceiver station (BTS) 205 detects a request for a communication request to the receiver (Bob) 230. Call identification information is passed from the base transceiver station (BTS) 205 to the base station controller (BSC) 210 and then onto the appropriate mobile switching center (MSC1) 215.

The mobile switching center (MSC1) 215 transmits data indicative of the identity of the mobile phone via a set of network switches to a home location register (HLR) 220, which scans data in its database to verify the subscriber's (Alice) 200 authority to access the requested communication services.

Upon verifying the authorization of the subscriber (Alice) 200 to obtain the requested communication services, the home location register (HLR) 220 transmits control data to the local mobile switching center (MSC1) 215 which then processes information such as the origin of the requested call, etc., and transmits the call information to a mobile switching center (MSC2) 225 which is local to the receiver (Bob) 230 to allow the receiver (Bob) 230 to receive the voice communication. In the above scenario the BTS 205, BSC 210, MSC 215, and HLR 220 are implemented in a distinct hardware platform running unique software. The implementation of a mobile network for a country the size of the UK, for example, requires tens of thousands of cells 130 and tens of thousands of corresponding base station controllers (BTS) 205 as well as hundreds of mobile switching centers (MSC) 215—which in turn will require hundreds of thousands of processing nodes.

Figure 3:
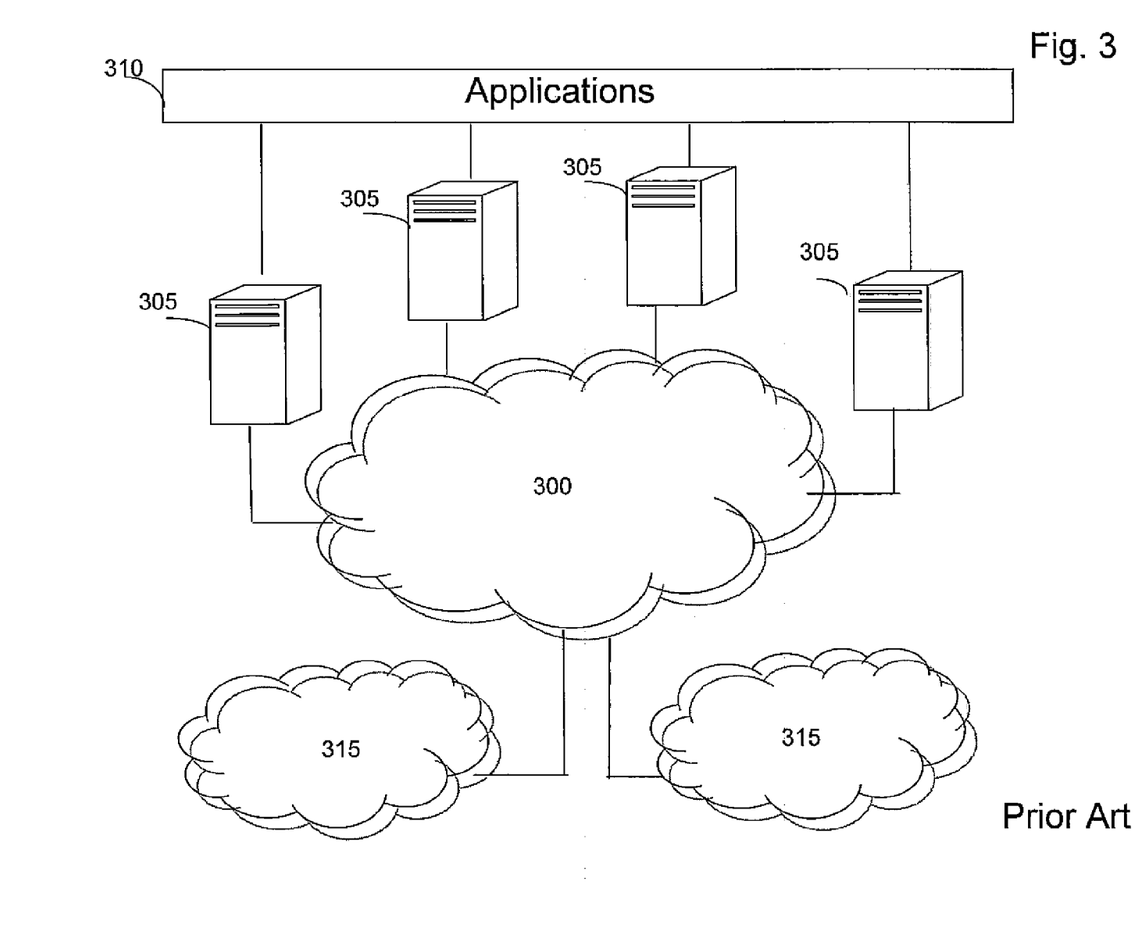
FIG. 3 is a block diagram detailing applications and services operable in an IP based network.

FIG. 3 shows a simplified diagram of a cloud computing environment in which a number of IP based applications 310 are running on a number of processing nodes 305 accessible via an IP based network. In this context the term IP mean an internet protocol based network. A processing node 305 is a server or other computing device which is operable for receiving requests from requesting client devices and fulfilling those requests over an IP based network 300, 315.

The term cloud computing is used as a term to describe a complex IT infrastructure in which services are accessible through the IT infrastructure. A cloud computing infrastructure typically requires a plurality of computing devices 305, a plurality of data centers 305, a network 300, 315 with suitable bandwidth capabilities, and a considerable power resource and suitable server cooling means. Service providers host technology enabled services from the internet, often without knowledge or control of the infrastructure that supports the services. An example of this is when a user access a services such as a photograph editing, storage and retrieval service via their web browser across the internet. More and more business applications are being made available so that a user can access these applications via their web browser across the internet. A characteristic of the network 300, 315 is its high bandwidth and high availability capability which is able to process requests for application resources in a demand driven fashion, i.e., a resource is allocated when it is requested.

Some service providers may 'own' the infrastructure themselves. For example the cloud 300 may be owned by a service provider 'A' with a number of applications 310 running on processing nodes 305 using standard compute and storage virtualization technologies. Thus one application may be virtualized across a number of processing nodes 305 or the application may run one processing node only 305. Some processing nodes 305 may act as storage devices. One high speed/high availability network is operable with other high speed/high availability networks. For example, application 'A' may be accessible via network 300 but associated storage requirements may be accessible via network 315 owned by service provide 'B'. A cloud application can be defined as an application that is accessible over a network 300, 315 without the need for the installation and running of the application on a client computer. This eliminates the need for software maintenance, support, upgrades, etc., on behalf on of the client computer.

In order for a telecommunication service provider to take advantage of the benefits provided by a cloud computing environment a new telecommunication network topology is proposed with a mechanism in which to provide high availability services and recovery mechanisms.

Figure 4:
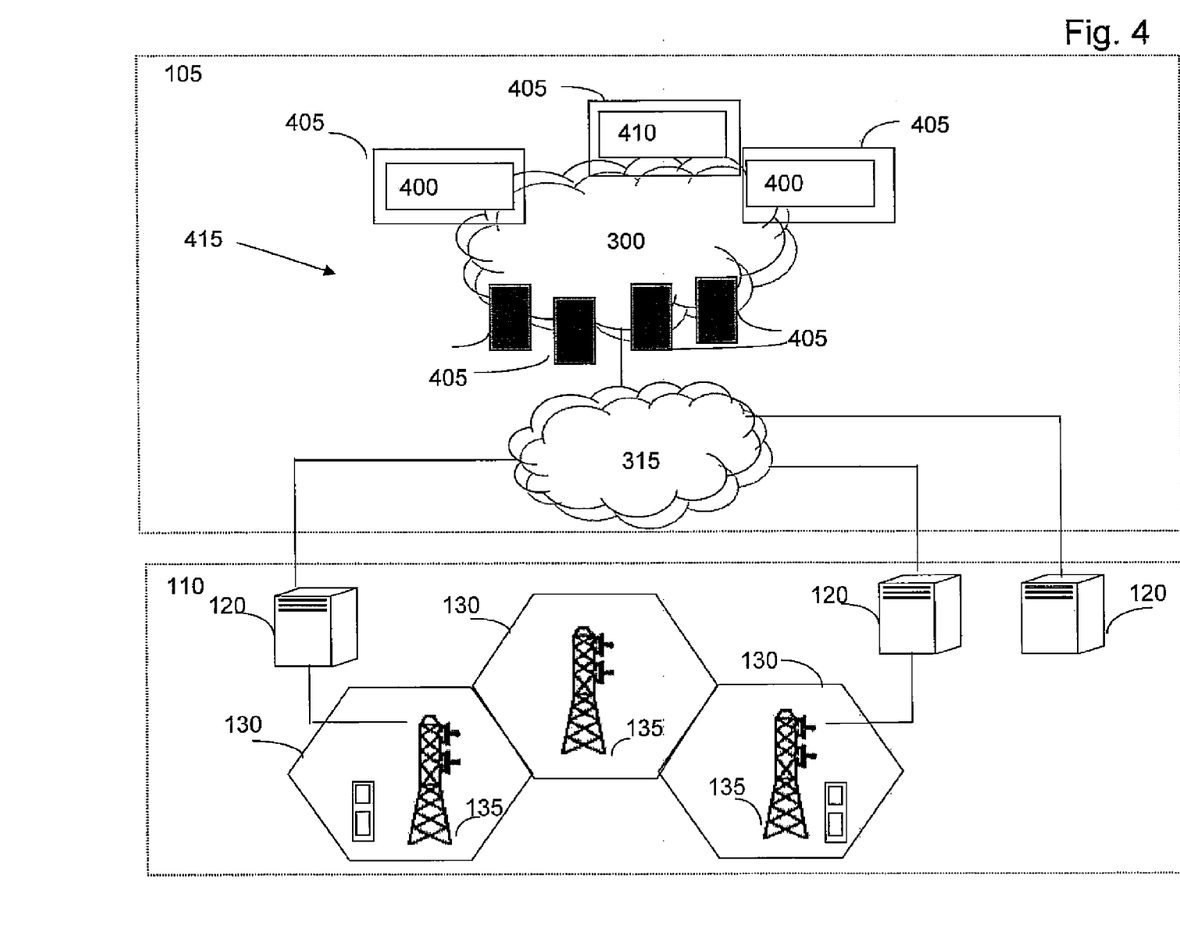
FIG. 4 is a block diagram of a telecommunication network operable in a distributed data processing network in which the present invention may be embodied.

This is shown in FIG. 4. In this example, the radio access network subsystem 110 is connectable to a cloud computing infrastructure 415 which performs a subset of the functions of the radio access network subsystem 110 as well as the function of the network switching subsystem 105.

The radio access network subsystem 110 comprises a plurality of cells 130 each cell 130 providing a geographical coverage area. Associated with each cell 130 is a base transceiver station (BTS) 135 and a base station controller (BSC) 120.

The base station controller (BSC) 120 is modified in order to communicate across an IP network to a call session control function (CSCF) 400 in the network switching subsystem 105 in a cloud computing environment. The modification comprises embedding knowledge of which instance of a call session control function 400 to send the communication request and signaling information too. Each processing node 405 comprise an instance of a call session control function (CSCF) 400 for communication with and receiving requests from the radio access network subsystem 110.

If a subscriber accesses a purely IP-based service such as a social networking application from a mobile device, a service request in the form of one or more IP packets (e.g., using HTTP/HTTPS) is sent from the subscriber's mobile device though a base transceiver station (BTS) and is then sent to an IP network instead of being routed to an instance of a call session control function (CSCF).

The service request is then sent from a first service provider's IP based network to the (second) service provider's IP network that hosts the requested service through an interconnection, which may be the public internet. The service request is processed in a service instance implemented in a web server or application server in the second service provider's network.

If the requested service then requires access to the telecommunication service provider's network to send an SMS or to initiate a conference call or for other purposes a request for access is carried out through an API which is instantiated in a third party gateway or Service Delivery Platform (SDP) in the telecommunication provider's network.

A first IP network 300 is operable for communication with a plurality of processing nodes 405. Each processing node 405 comprises hardware (for example, storage, processors, motherboard, etc.), an operating system for providing the low level management of the hardware and software operable with the processing node 405, and a management layer such as a hypervisor for running and managing a plurality of virtual machines on a processing node 405. Running on each virtual machine is an instance of a call session control function (CSCF) 400 (a mobile switching function in a 2G network). Thus a situation may arise wherein a processing node 405 comprises a plurality of virtual machines and each virtual machine may comprise an instance of a call session control function (CSCF) 400. Each of these instances is implemented in software. An instance in this context is a term used for a an application being launched multiple times or operable on multiple processing nodes.

An instance of a home subscriber service (HSS) 410 is operable for running on a processing node 405. A home subscriber service is a database comprising a subscriber's phone number, subscription service information, SIM card information, subscriber physical location information and also performs such functions as authentication and authorization of each subscriber.

Figure 5:
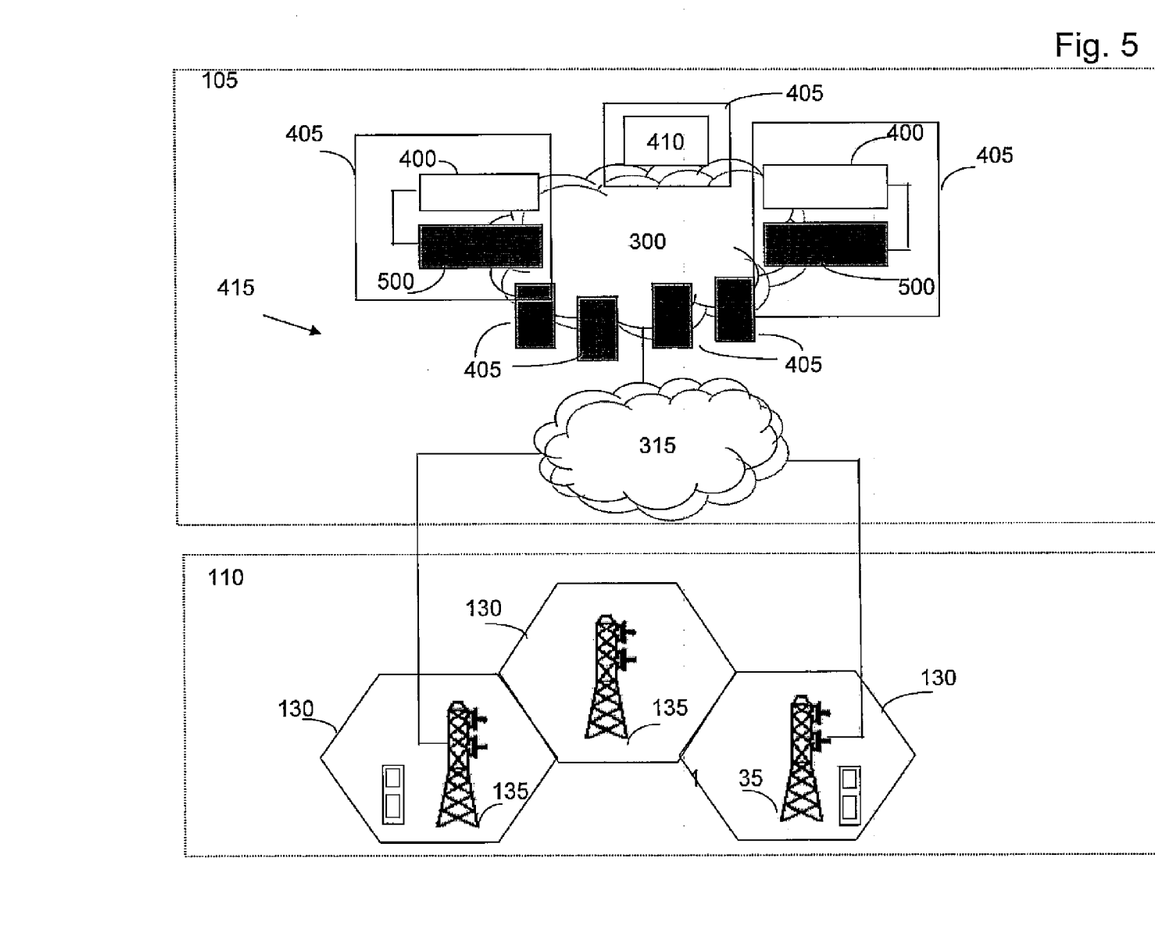
FIG. 5 is a block diagram of another embodiment of a telecommunication network operable in a distributed data processing network in which the present invention may be embodied.

A base transceiver station (BTS) of FIGS. 4 and 5 may also be embodied as part of the network switching subsystem 105.

With reference to FIG. 5, the network switching subsystem 105 comprises a first IP network 300 operable with a second IP network 315, wherein the at least first IP network comprises characteristics of a cloud computing infrastructure.

The first IP network 300 is operable for communication with a plurality of processing nodes 405. Each processing node 405 comprises hardware, for example, storage, processors, motherboard, etc., an operating system for providing low level management of the hardware and software operable with the processing node 405 and a management layer such as a hypervisor for running and managing a plurality of virtual machines on a processing node 405. Running on each virtual machine is an instance of a call session control function (CSCF) 400 (a mobile switching function in a 2G network) and an instance of a radio network control function (RNCF). Thus a situation can arise wherein a processing node 405 comprises a plurality of virtual machines and each virtual machine may comprise a call session control function (CSCF) 400 and a radio network control function (RNCF) 500. These functions and instances thereof are implemented in software.

The call session control function (CSCF) 400 is responsible for performing signaling operation for call session control. The call session control function (CSCF) 400 establishes, monitors, supports, and releases multimedia sessions and manages the subscriber's service interactions. The call session control (CSCF) 400 function also invokes processing nodes 405 related to the subscriber's requested services.

A home subscriber service (HSS) instance 410 is a database comprising a subscriber's phone number, subscription service information, SIM card information, subscriber physical location information and also performs such functions as authentication and authorization of each subscriber.

A radio signal received from the antenna or antennas of the base station, in the radio access network) is converted to digital form and transmitted over a network 315, 300 to an instance of a radio network control function which is implemented within the cloud computing infrastructure. After processing, any radio signals for transmission are generated by the radio network control function within the cloud computing infrastructure and are transmitted over a network 315, 300 to the antenna or antennas, in an appropriate cell, where the radio signals are converted from digital form to the form required for transmission.

Thus, once the components as depicted in the embodiment of FIG. 4 or FIG. 5 are operational within the first IP network (the Cloud) it is possible to allocate and process resources from all associated IP networks 300, 315. It is not necessary to provide dedicated backup processing units for every base transceiver station. In the event of failure a new processing node is allocated from a processing node that is associated with the first or second IP network 300, 315. This also applies to the service switching layer which is comprised of all the call session control function (CSCF) instances and home subscriber services (HSS) instances.

In prior art GSM networks the base transceiver station is environmentally hostile (e.g., located outdoors) and so processing nodes associated with radio base stations are more expensive than those located in a data center. The same cloud infrastructure provides the processing resources for higher level system such as service switching including connection management for voice and data connections, operational support system to support provisioning subscriber management service management and fault management for services such as social networking applications and music on-demand services, etc.

Figure 6:
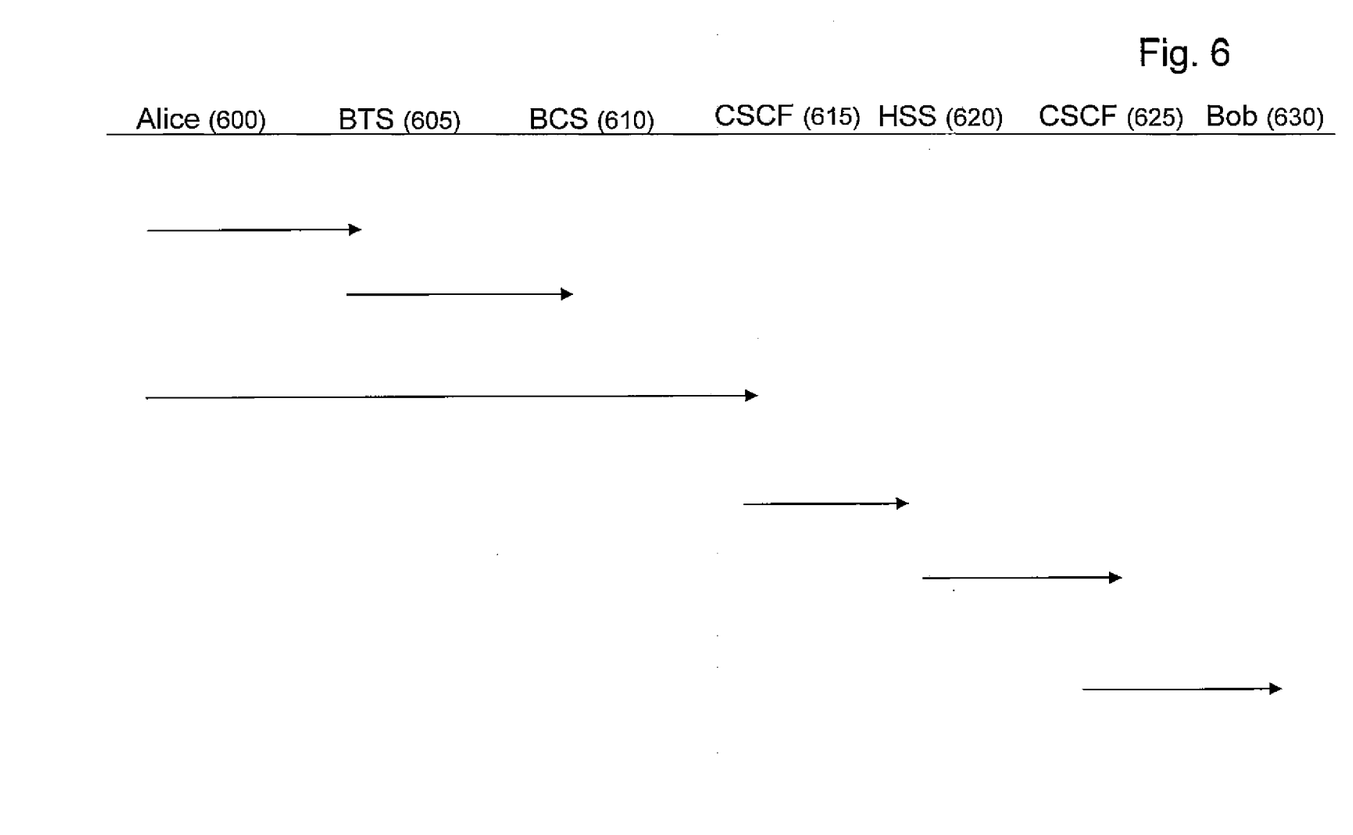
FIG. 6 is a sequence diagram of the operational steps of a call being initiated in accordance with the embodiment of FIG. 4.

FIG. 6 details the sequence steps of a subscriber (Alice) initiating a voice call to a receiver (Bob) of an embodiment of FIG. 4.

A subscriber (Alice) 600 initiates a call to receiver (Bob) 630 via her mobile phone or other telecommunication device. The base transceiver station (BTS) 605 detects a request for a communication request to the receiver (Bob) 630. Call identification information is passed from the base transceiver station (BTS) 605 to the base station controller (BSC) 610 and then onto the appropriate call session control function (CSCF) instance 615.

The call session control function (CSCF) instance 615 transmits data indicative of the identity of the mobile phone via a set of network switches to a home subscriber service (HSS) 620, which scans data in its database to verify the subscriber's (Alice) 600 authority to access the requested communication services.

Upon verifying the authorization of the subscriber (Alice) 600 to obtain the requested communication services, the home subscriber service (HSS) 620 transmits control data to the local call session control function (CSCF) instance 615 which then processes information such as the origin of the requested call, etc. and transmits the call information to a call session control function (CSCF) instance 625 which is local to the receiver (Bob) 630 to allow the receiver (Bob) 630 to receive the voice communication. In the above scenario the BTS 605, BSC 610, CSFC 615, 625 and HSS 620 are implemented in software.

Figure 7:
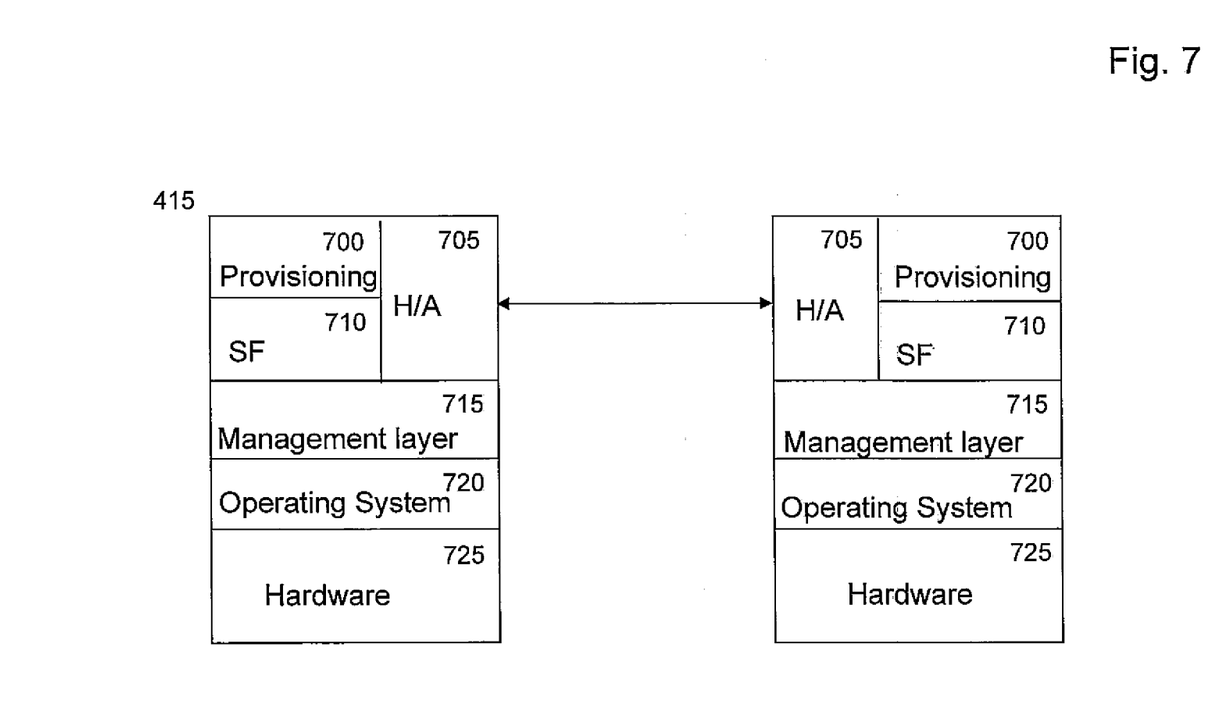
FIG. 7 is a block diagram detailing a processing node in which an aspect of the present invention may be embodied.

Turning to FIG. 7 a processing node 405 is shown. Typically a telecommunication processing node 405 comprises the following: component hardware 725 (such as processors, motherboard, storage, etc.), an operating system 720 for providing low level management of the hardware and software operable with the processing node, and a management layer 715 such as a hypervisor for running and managing a plurality of virtual machines on a processing node. Running on each virtual machine is a switching function 710 which comprises an instance of a call session control function (CSCF) (a mobile switching function in a 2G network) (an instance thereof) and an instanced of a radio network control function (RNCF).

The processing node 405 further comprises a provisioning component 700 for provisioning requests from subscribers to join the telecommunication network (task such as, SIM registering) and a high availability component for detecting when a processing node has failed and for determining a new processing node to take the place of the failed proceeding node.

To be clear—a failed processing node 405 is a node which is determined as no longer functioning satisfactorily because of a hardware failure, a software failure at the operating system level or management layer, a software fault in a virtual machine operating on the processing node or the network connection to that processing node failing and thus no other processing node on other network being able to communicate with the processing node.

Figure 8:
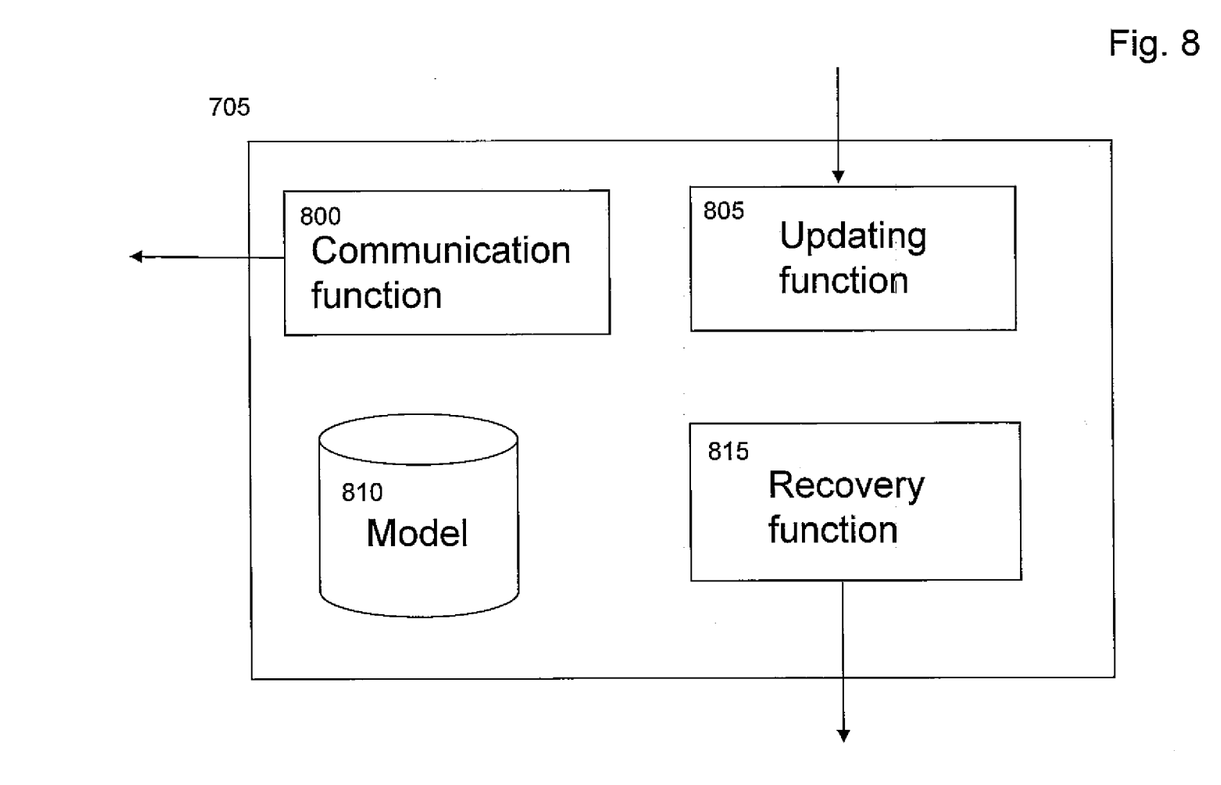
FIG. 8 is a block diagram detailing the components of the high availability component in accordance with an embodiment of the present invention.

The components of the high availability component are shown with reference to FIG. 8.

The high availability component 705 comprises an operational model 810 of the telecommunication's cloud network topology including any associated networks and any associated processing nodes 405.

The model 810 is derived from network administrator entered data about which processing nodes are associated with the network, the resources available on the processing node for example, the number of virtual machine operating on a processing node, the telecomm specific functions are available on a virtual machine (CSCF and HSS instance) and which subscriber requested resources are available on each virtual machine, etc.

The high availability component 705 also comprises a communication system 800 for sending out requests for acknowledgements that a processing node (or each virtual machine) is functioning on the network. The communicating system 800 may comprise a network IP address 'ping' function which informs the communicating means whether the processing node or virtual machine is operational. An updating system 805 updates the communication response in the network model. The communication system is initiated in a time frame stated by the network administrator. This communication response is updated into the network model. In the event that a processing node does not respond a failure recovery plan function is initiated by a recovery function 805. The failure recovery plan is based on three types of backup plans:
Hot recovery
Warm recovery
Cold recovery A hot recovery plan is where an alternative processing node is equipped with resources to recover the functions of another processing node affected by the failure of the processing node. This would, for example, mean that another processing node, associated with the network, is waiting in standby mode and mirrored the application resources. For example, resources such as the corresponding number of virtual machines each running a control state function instance, a home subscriber service instance and a radio network control function instance (in the case of an embodiment of FIG. 5), any other application which provide requested services, etc., and wherein appropriate data is constantly being backed up to the alternative processing node as the data is written to the first processing node (i.e., the processing node affected by failure). In this example, in the event of failure, the switch over from a failed processing node to backup processing node is instantaneous.

A warm recovery plan is when an alternative processing node is running but does not keep in synchronization with the failed processing node and which is able to take over in the event of failure. In this case there may be a delay to establish the state of the failed processing node or some processing functions may be interrupted.

A cold recovery plan is one where a backup processing node is not running and must be started. In this case there maybe a delay to start the processing node and a further delay to establish the state of the failed processing or some processing functions may be interrupted.

The high availability component 705 is also able to detect patterns in processing needs from subscribers. For example, by analyzing past historical activity of processing nodes and analyzing activity from geographical areas associated with subscriber requests it is possible to 'stand down' processing nodes or one or more virtual machines operable on a processing node when the processing node is not required. Further, it is possible to transfer requests for resources to other processing nodes and 'stand down' a processing node when the network traffic to a processing node is determined to be at a minimal i.e. below a predefined network traffic threshold. Thus the high availability component is also able to perform load balancing based on geographical analysis of subscriber requests for resources.

It will be clear to one of ordinary skill in the art that all or part of the method of the embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

Figure 9:
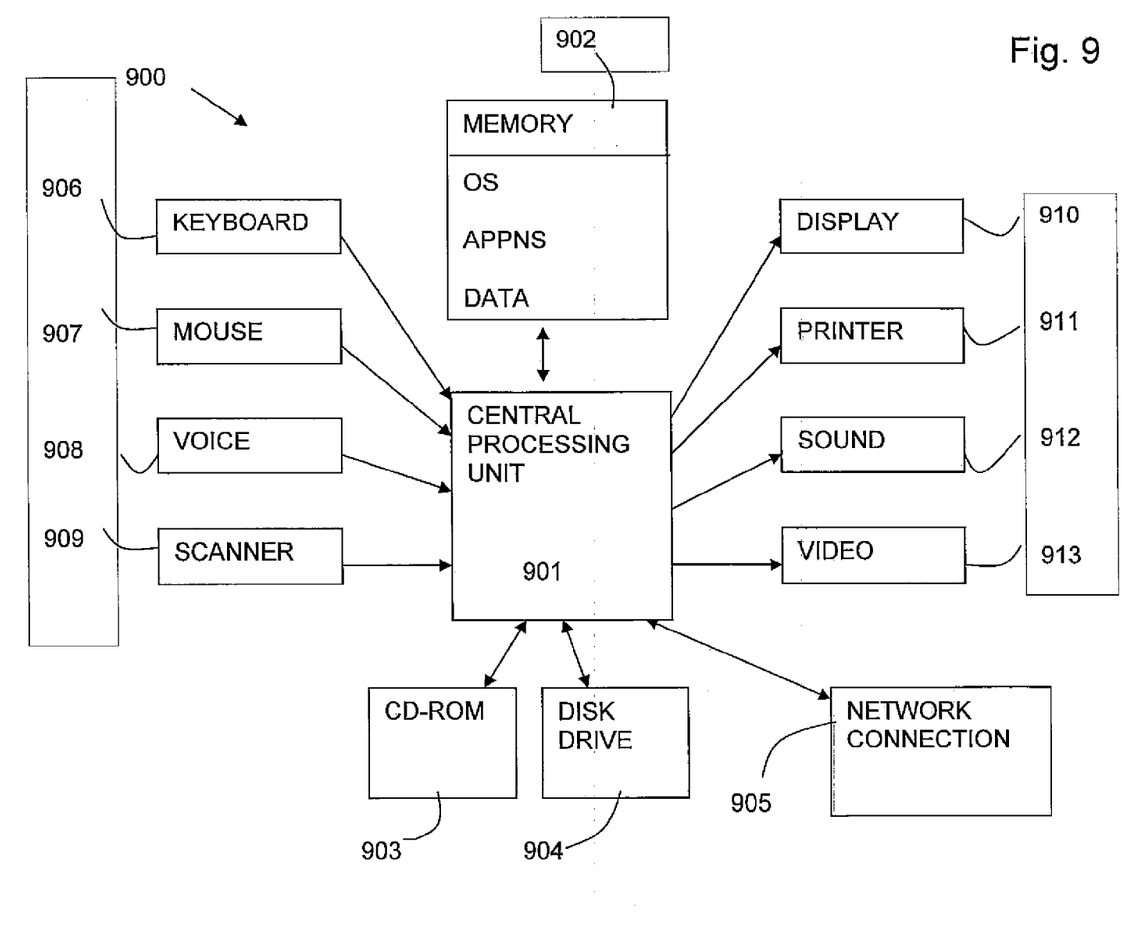
FIG. 9 is a computer apparatus in which an aspect of the present invention may be embodied in accordance with an embodiment of the present invention.

FIG. 9 shows a computing device 900 which is operable for running application implemented in software. The computing device has a central processing unit 901 with primary storage in the form of memory 102 (RAM and ROM). The memory 902 stores program information and data acted on or created by application programs. The program information includes the operating system code for the computing device 900 and application code for applications running on the computing device 900.

Secondary storage includes optical disk storage 903 and magnetic disk storage 904. Data and program information can also be stored and accessed from the secondary storage.

The computing device 900 includes a network connection means 905 for interfacing the computing device 900 to a network such as a local area network (LAN) or any type of IP based network. The computing device 100 may also have other external source communication means such as a fax modem or telephone connection.

The central processing unit 901 comprises inputs in the form of, as examples, a keyboard 906, a mouse 907, voice input 908, and a scanner 909 for inputting text, images, graphics or the like. Outputs from the central processing unit 901 may include a display means 910, a printer 911, sound output 912, video output 913, etc.

Applications may run on the computer device 900 from a storage means 903, 904 or via a network connection 905, which may include database applications, etc. A computing device is not limited to any type of data processing system or apparatus, and may be a conventional server or other data processing device, which is capable of running applications.

It will be equally clear to one of skill in the art that all or part of a logic arrangement according to embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable storage medium (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, embodiments of the present invention may be realized in the form of a computer implemented method of deploying a service comprising steps of deploying computer program code operable to, when deployed into a computer infrastructure and executed thereon, causes the computer system to perform all the steps of the method.

In a further alternative, embodiments of the present invention may be realized in the form of data carrier having functional data thereon, the functional data comprising functional computer data structures to, when loaded into a computer system and operated upon thereby, enable the computer system to perform all the steps of the method.

It will be clear to one skilled in the art that many improvements and modifications can be made to the foregoing exemplary embodiments without departing from the scope of the present invention.

The invention claimed is:

1. A telecommunication network comprising:
a radio access network; and
a network switching subsystem for communicating with the radio access network and with a demand-driven, dynamically-configurable IP based cloud computing infrastructure,
wherein the network switching subsystem comprises a plurality of cloud-based processing nodes,
each cloud-based processing node comprising:
a software instance of a network switching function, wherein the network switching function comprises:
an instance of a call session control function,
a radio control function, and
a home subscriber service database for processing requests for communication services from subscribers,
a provisioning component for provisioning a request for each subscriber to join the telecommunication network,
a high availability component for sending requests for each cloud-based processing node to send a functional acknowledgement and receiving a message that at least one cloud-based processing node is failing, for analyzing past activity of each processing node and analyzing a geographical area of each subscriber request, for detecting in response to the analyzing a pattern for the plurality of cloud-based processing nodes of past activity and geographical area, and for determining in response to the detecting whether additional processing resources are required by the at least one of the cloud-based processing nodes or whether the at least one of the cloud-based processing nodes can be powered down because of a minimal amount of network traffic being detected, and
a failure recovery component for selecting one of a hot recovery, a warm recovery, and a cold recovery, wherein the hot recovery selects an alternative processing node to recover the failed at least one cloud-based processing node, wherein the warm recovery selects the alternative processing node to run asynchronously from the failed at least one cloud-based processing node, and wherein the cold recovery starts an alternative processing node that is not running.

2. The telecommunication network as claimed in claim 1, wherein a base station controller function is associated with the network switching subsystem for processing communication requests from subscribers.

3. The telecommunication network as claimed in claim 1, wherein the IP based computing infrastructure is a high bandwidth and high availability network.

4. The telecommunication network as claimed in claim 1, wherein each cloud-based processing node further comprises the high availability component for monitoring operating parameters of the cloud-based processing node.

5. The telecommunication network as claimed in claim 1, wherein the telecommunication network is a third generation network.

6. The telecommunication network as claimed in claim 1, wherein a request is received from a subscriber's mobile phone for accessing an IP based resource associated with a third party IP based network, and wherein a request comprising one or more IP packets is transmitted from the mobile phone device through a base transceiver station to an IP based network of a service provider who is hosting the requested resource.

7. The telecommunication network as claimed in claim 6, wherein if the request for a resource further comprises requests for telecommunication specific services a request is instantiated through an API of a service provider's IP based network in order to communicate a request to a call session control function in the telecommunication network.

8. A computer program product on a non-transitory computer readable storage medium and loadable into the internal memory of a digital computer, comprising software code portions for performing, when the product is run on a computer:
receiving a request for a voice or data communication by a radio access network;
communicating the received request to a network switching subsystem for processing by a demand-driven, dynamically-configurable IP based cloud computing infrastructure,
wherein the network switching subsystem comprises a plurality of cloud-based processing nodes, each cloud-based processing node comprising a software instance of a network switching function, and wherein the network switching function comprises: an instance of a call session control function, a radio control function, and a home subscriber service database for processing requests for communication services from subscribers; and
provisioning a request for each subscriber to join the telecommunication network;
analyzing past activity of each processing node and analyzing a geographical area of each subscriber request, detecting in response to the analyzing a pattern for the plurality of cloud-based processing nodes of past activity and geographical area, and determining in response to the detecting, whether additional processing resources are required by the at least one of the cloud-based processing nodes or whether the at least one of the cloud-based processing nodes can be powered down because of a minimal amount of network traffic being detected,
sending requests for each cloud-based processing node to send a functional acknowledgement and receiving a message that a least one cloud-based processing node is failing, and
selecting one of a hot recovery, a warm recovery, and a cold recovery, wherein the hot recovery selects an alternative processing node to recover the failed at least one cloud-based processing node, wherein the warm recovery selects the alternative processing node to run asynchronously from the failed at least one cloud-based processing node, and wherein the cold recovery starts an alternative processing node that is not running.

\* \* \* \* \*